US007048882B2

(12) United States Patent
Vähälä et al.

(10) Patent No.: US 7,048,882 B2
(45) Date of Patent: May 23, 2006

(54) PROCESS FOR PRODUCING A POLYETHYLENE COATING ON A SUBSTRATE

(75) Inventors: Martti Vähälä, Porvoo (FI); Hannu Salminen, Porvoo (FI); Arja Lehtinen, Helsinki (FI)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 10/204,321

(22) PCT Filed: Feb. 19, 2001

(86) PCT No.: PCT/FI01/00161

§ 371 (c)(1), (2), (4) Date: Sep. 30, 2002

(87) PCT Pub. No.: WO01/62847

PCT Pub. Date: Aug. 30, 2001

(65) Prior Publication Data

US 2003/0042658 A1 Mar. 6, 2003

(30) Foreign Application Priority Data

Feb. 21, 2000 (FI) .................................. 20000397

(51) Int. Cl.
*B28B 3/20* (2006.01)
*C08F 8/00* (2006.01)
*C08F 2/00* (2006.01)
*B32B 27/10* (2006.01)

(52) U.S. Cl. .................. 264/176.1; 525/191; 525/240; 526/65; 428/511; 428/523

(58) Field of Classification Search ................ 428/515, 428/507, 511, 523; 264/171.1; 526/64, 526/65; 525/240, 191
See application file for complete search history.

(56) References Cited

U.S. PATENT DOCUMENTS

| 4,287,262 A * | 9/1981 | Engelhard et al. .......... 428/461 |
| 5,047,468 A | 9/1991 | Lee et al. ................... 525/53 |
| 5,494,965 A * | 2/1996 | Harlin et al. ................ 525/52 |
| 5,503,914 A * | 4/1996 | Michie et al. ............... 428/220 |
| 5,539,076 A * | 7/1996 | Nowlin et al. ............. 526/348.1 |
| 5,674,342 A | 10/1997 | Obijeski et al. ......... 156/244.11 |
| 5,858,491 A * | 1/1999 | Geussens et al. ........... 428/36.9 |
| 5,911,023 A * | 6/1999 | Risch et al. ................ 385/100 |
| 6,025,448 A | 2/2000 | Swindoll et al. ............ 526/127 |
| 6,127,484 A | 10/2000 | Cribbs et al. ............... 525/191 |
| 6,218,472 B1 * | 4/2001 | Debras et al. .............. 525/191 |
| 6,221,982 B1 * | 4/2001 | Debras et al. ............... 526/64 |
| 6,242,543 B1 * | 6/2001 | Follestad et al. ........... 526/118 |
| 6,262,195 B1 * | 7/2001 | Dall'Occo et al. .......... 526/113 |
| 6,291,601 B1 * | 9/2001 | Debras ........................ 526/64 |
| 6,458,911 B1 * | 10/2002 | Ong et al. ................ 526/348.1 |
| 6,486,270 B1 * | 11/2002 | Garrison et al. .............. 526/65 |
| 6,545,093 B1 * | 4/2003 | de Lange et al. ........... 525/191 |
| 6,642,332 B1 * | 11/2003 | Sage et al. .................... 526/64 |

FOREIGN PATENT DOCUMENTS

| WO | WO 95/12622 A1 | 5/1995 |
| WO | WO 95/35323 A1 | 12/1995 |
| WO | WO 96/16119 A1 | 5/1996 |
| WO | 97/03139 A1 | 1/1997 |
| WO | WO 97/28170 A1 | 8/1997 |
| WO | 98/30628 * | 7/1998 |
| WO | WO 98/30628 A1 | 7/1998 |
| WO | 99/09096 A1 | 2/1999 |
| WO | 00/40620 * | 7/2000 |

* cited by examiner

Primary Examiner—Kevin R. Kruer
(74) Attorney, Agent, or Firm—Birch, Stewart, Kolasch & Birch, LLP.

(57) ABSTRACT

This invention concerns a process for coating a substrate, and an extrusion coating structure. According to the present process, the coating is provided by producing a bimodal polyethylene composition by subjecting ethylene, optionally with hydrogen and/or comonomers to polymerization or copolymerization reactions in a multistage polymerization sequence of successive polymerization stages. The polymerization reactions are carried out in the presence of a single site catalyst capable of forming a composition which comprises a low molecular weight component with an $MFR_2$ of 20 g/10 min or more and a density higher than the density of the composition, and a high molecular weight component, said composition having a melt flow rate $MFR_2$ of 5 g/10 min or more and a density of 915–960 kg/m$^3$. The composition is extruded on the substrate as such or by adding 10 wt-% or less, calculated from the total weight of the coating, of high pressure PE-LD by blending into the extrusion composition or by coextrusion.

24 Claims, No Drawings

PROCESS FOR PRODUCING A POLYETHYLENE COATING ON A SUBSTRATE

This application is the national phase under 35 U.S.C. § 371 of PCT International Application No. PCT/FI01/00161 which has an International filing date of Feb. 19, 2001, which designated the United States of America.

BACKGROUND OF THE INVENTION

1. Field of the Invention

The present invention concerns a process for coating a substrate by extruding a polyethylene composition thereon. In addition, the present invention concerns an extrusion coating structure.

2. Description of Related Art

Low density polyethylene (PE-LD) made by a high pressure process (referred to as "high pressure PE-LD") has been used conventionally for extrusion coating. High pressure PE-LD is easy to process, provides adequate moisture barrier and has good sealing properties. The mechanical properties of high pressure PE-LD are, however, not as good as those of other PE grades. This means that a thicker layer of high pressure PE-LD is needed to achieve the mechanical properties required for a coating.

Linear low density polyethylene (PE-LLD), medium density polyethylene (PE-MD) or high density polyethylene (PE-HD) materials exhibit better mechanical properties. On the other hand, a PE composition with a higher density is more difficult to extrude, and the neck-in in extrusion is typically increased as the density increases.

The problem of the combination of good mechanical properties and good processability has been tried to overcome by blending high pressure PE-LD with other PE grades. Another solution has been to coextrude HD, MD or LLD polyethylene together with PE-LD.

On the whole, it is desirable to try to decrease the total amount of polyethylene in a coated product due to the demands of environmental regulations. In particular, it is of importance to decrease the amount of high pressure PE-LD in a coated product, because the production of high pressure PE-LD in the world is decreasing. The present focus in polyethylene production is in the low pressure processes, and thus most often the high pressure PE-LD has to be bought and brought to the plant. This increases the costs of the manufacturer of the extrusion coating.

WO 98/30628 discloses an extrusion coating structure comprising a bimodal ethylene polymer. The ethylene polymer is a blend of at least two different ethylene polymers and it contains 80–100% ethylene repeating units and 20–0% alpha-olefin repeating units. The density of the ethylene polymer is 0.920–0.960 kg/m$^3$.

The ethylene polymer blend can be made in a reactor sequence using a single site or a Ziegler-Natta type catalyst. The catalyst used in the examples is, however, not defined. It is to be noted that in the examples the materials are either blended with 15% of high pressure PE-LD or coextruded with PE-LD. According to our experiments this would indicate that the material in the examples is produced using Ziegler-Natta catalysts. Nothing is mentioned of the advantages of using a single site catalyst, especially of the possibility of extrusion of the composition without blending or coextruding with high pressure PE-LD when using a polyethylene composition produced by single site catalysts.

WO 96/16119 discloses a polyethylene extrusion composition comprising from 75 wt-% to 95 wt-% of at least one ethylene/α-olefin interpolymer composition having a density in the range of 850 kg/m$^3$–940 kg/m$^3$ and from 5 to 25 wt-% of high pressure ethylene polymer. The extrusion composition according to the publication has a melt index equal to or greater than 1 g/110 min. It is stated in the publication that the ethylene/α-olefin interpolymer can be prepared in any conventional way, inter al., by polymerizing in a reactor sequence using a homogeneous single site catalyst. The ethylene/α-olefin interpolymers disclosed in the examples are substantially linear ethylene/1-octene copolymer and a homogeneously branched linear ethylene/1-hexene copolymer. None of these materials is bimodal, and the melt flow properties obtained are due to the long-chain branching of the materials. The catalyst most probably used in the examples is called constrained geometry catalyst, but this is not specifically stated. The polymerization conditions are not defined, either.

U.S. Pat. No. 5,674,342 discloses a process for extrusion coating a substrate. The composition used in the coating process consists according to one alternative solely of ethylene polymer having a Dow Rheology Index (DRI) of at least 0.1. The ethylene polymer is, according to the examples a substantially linear polymer, which is not bimodal. According to the publication it is possible to use either single site catalysts or constrained geometry catalysts in the polymerization. It is stated in the publication that the constrained geometry catalysts are preferably used and that preferably a solution polymerization process is employed. In the examples, however, the used catalyst or process conditions are not indicated.

For the sake of completeness it should be mentioned that cast films (i.e. not extrusion coatings) have been made of substantially linear polymers having a bimodal molecular weight distribution which have been produced by a metallocene catalyst in a two-stage solution process (WO 99/09096). The polymers produced in the different stages were reported to have equal densities. Specifically, the catalyst has the ability to produce long chain branches in the polymer. The processibility of the polymer on the film line was reported to be good. However, based on the disclosure it is not possible to ascertain whether the prior polymers would have a good processability on the extrusion coating line, where the line speed ins 100–500 m/min, compared to the film line having a line speed of a few meters per minute.

SUMMARY OF THE INVENTION

It is an aim of the present invention to eliminate the drawbacks of prior art and to provide a novel process for coating a substrate by extrusion by producing such a bimodal extrusion composition of polyethylene, which can be extruded as such or with addition only of small amounts of high pressure PE-LD either by blending or coextrusion.

The invention is based on the surprising finding that by polymerizing ethylene in the presence of a single site catalyst in a multireactor sequence a polyethylene composition can be obtained which exhibits improved mechanical properties and can still be extruded on a substrate either as such or by adding 10 wt-% or less of high pressure PE-LD either by blending into the extrusion composition or by coextrusion.

More specifically, the present process is characterized by what is stated in the characterizing part of claim 1.

The extrusion coating structure is characterized by what is stated in the characterizing part of claim 15.

A number of considerable advantages are obtained by means of the present invention. The present process enables the production of a composition which can be used in extrusion coating either as such or blended or coextruded with high pressure PE-LD, the amount of PE-LD being 10 wt-% or less of the total mass of the polyethylene coating. When less high pressure PE-LD is needed in the coating, the production of the coating is cheaper.

The coating produced by the present process exhibits better mechanical properties than high pressure PE-LD and, thus, a thinner layer of the coating is needed. This is in accordance with the public demand to use less polyethylene in the coating for environmental reasons. In particular, the tensile strength and tear strength in machine and transverse directions are on a good level and superior to materials intended for similar purposes. Also the optical properties are better than those of conventional materials; the gloss of the coating film is high and the haze is low.

The present extruded coating structure exhibits excellent resistance to environmental stress cracking. Surprisingly the resistance does not decrease as a function of time. In packaging, this is a true benefit since the manufacturers of liquid products need to be certain that their products are packed so as to ensure a delivery of a non-contaminated product to consumers.

DETAILED DESCRIPTION OF THE INVENTION

Definitions

For the purpose of the present invention, "slurry reactor" designates any reactor operating in slurry, in which reactor the polymer forms in particulate form. As examples of suitable reactors can be mentioned a continuous stirred tank reactor, a batch-wise operating stirred tank reactor or a loop reactor. According to a preferred embodiment the slurry reactor comprises a loop reactor.

By "gas phase reactor" is meant any mechanically mixed or fluidized bed reactor. Preferably the gas phase reactor comprises a mechanically agitated fluidized bed reactor with gas velocities of at least 0.2 m/sec.

"Reaction zone" or "polymerisation zone" stands for one or several reactors of similar type producing the same type or characteristics of polymer connected in the series.

By "melt flow rate" or abbreviated "MFR" is meant the weight of a polymer extruded through a standard cylindrical die at a standard temperature in a laboratory rheometer carrying a standard piston and load. MFR is a measure of the melt viscosity of a polymer and hence also of its molecular weight. The abbreviation "MFR" is generally provided with a numerical subindex indicating the load of the piston in the test. Thus, e.g., $MFR_2$ designates a 2.16 kg load. MFR can be determined using, e.g., by one of the following tests: ISO 1133 C4, ASTM D 1238 and DIN 53735.

The Catalyst

The catalyst used in the polymerization process is a single site catalyst. According to a preferred embodiment, no fresh catalyst is added to the second polymerization stage. The catalyst should produce a bimodal, i.e., rather broad, molecular weight distribution and comonomer distribution. Additionally, the catalyst should be able to produce a molecular weight of at least 150000–200000 g/mol in the high molecular weight polymer fraction, so that good mechanical properties are obtained. Some metallocene catalysts, like those based on a bis-(n-butyl cyclopentadienyl) zirconium dichloride complex and disclosed in FI-A-934917 (=WO 95/12622) are not able to produce a high enough molecular weight polyethylene and their usefulness in bimodal polymerization is limited. It has been found that some metallocene catalysts are able to produce a high enough molecular weight. One example of such catalysts is based on another complex disclosed in WO 95/12622, having the general formula

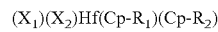

$(X_1)(X_2)Hf(Cp-R_1)(Cp-R_2)$ wherein $X_1$ and $X_2$ are either same or different and are selected from a group containing halogen, methyl, benzyl or hydrogen;

Hf is hafnium;

Cp is a cyclopentadienyl group; and $R_1$ and $R_2$ are the same or different and selected from the group of linear and branched hydrocarbyl groups containing 1–10 carbon atoms.

Particularly suitable complexes of the kind described above are bis-(n-butyl cyclopentadienyl) hafnium dihalides. Another group of suitable complexes are the siloxy-substituted bridged bis-indenyl zirconium dihalides, which are disclosed in FI-A-960437 (=WO 97/28170).

These catalysts are typically supported on a solid carrier, but they may also be used as unsupported. The carrier is typically inorganic, and suitable materials comprise, e.g., silica (preferred), silica-alumina, alumina, magnesium oxide, titanium oxide, zirconium oxide and magnesium silicate (cf. also WO 95/12622). The catalysts are normally used together with an aluminumoxane cocatalyst. Suitable cocatalysts are, e.g., methylaluminumoxane (MAO), tetraisobutylaluminumoxane (TIBAO) and hexaisobutylaluminumoxane (HIBAO). The cocatalyst is preferably supported on the carrier, typically together with the catalyst complex, although the cocatalyst may optionally be fed into the reactor separately.

A catalyst based on bis-(n-butyl cyclopentadienyl) hafnium dihalide complex supported on a silica or a silica-alumina carrier together with a methylaluminoxane cocatalyst is suitable to be run in a process including a loop rector and a gas phase reactor. Especially suitable is a catalyst based on bis-(n-butyl cyclopentadienyl) hafnium dichloride. Both the complex and the cocatalyst are supported on the carrier.

The thus obtained catalyst is then fed into the reactor. The catalyst is easy to feed and the polymer settles well in the loop reactor. This makes the loop reactor operation easy.

In the gas phase reactor the catalyst is able to produce a sufficiently high molecular weight material. This is essential to obtain the required processability on the film extrusion line and good mechanical properties of the film.

Polymerization Process

To produce the bimodal polyethylene composition used for extrusion coating according to the invention, ethylene is polymerized in the presence of a single site catalyst at elevated temperature and pressure.

Polymerization is carried out in a series of polymerization reactors selected from the group of slurry and gas phase reactors. In the following, the reactor system comprises one loop reactor (referred to as "the first reactor") and one gas phase reactor (referred to as "the second reactor"), in that order.

However, it should be understood that the reactor system can comprise the reactors in any number and order. It is also possible to conduct the process in two or more gas phase reactors.

The high molecular weight portion and the low or medium molecular weight portion of the product can be prepared in any order in the reactors. It is to be understood that "high" and "low" are the components with a "higher" or "lower" molecular weight compared with each other. A separation stage is normally employed between the reactors to prevent the carryover of reactants from the first polymerization stage into the second one. The first stage is typically carried out using an inert reaction medium.

In every polymerization step it is possible to use also comonomers selected from the group of $C_{3-18}$ olefins, preferably $C_{4-10}$ olefins, such as 1-butene, 1-pentene, 1-hexene, 4-methyl-1-pentene, 1-heptene, 1-octene, 1-nonene and 1-decene as well as mixtures thereof and dienes, such as 1,5-hexadiene and 1,9-decadiene.

In addition to the actual polymerization reactors used for producing the bimodal ethylene homo- or copolymer, the polymerization reaction system can also include a number of additional reactors, such as prereactors and postreactors. The prereactors include any reactor for prepolymerizing the catalyst and for modifying the olefinic feed, if necessary. The postreactors can be used, for example, for blending additional components such as the small amount of high pressure PE-LD to the polymerization product. All reactors of the reactor system are preferably arranged in series (in a cascade).

The polymerization steps may be performed in the most convenient order. Thus, it is possible to polymerize the low molecular weight component in the first step of the process and the high molecular weight component in the second step. It is also possible to perform the steps in a reversed order, i.e., to polymerize the high molecular weight component in the first stage and the low molecular weight component in the second stage. If the first stage involves a slurry polymerization, it is preferred to produce the low molecular weight component in that stage to avoid problems due to the solubility of the polymer.

According to the present invention, the bimodal polyethylene composition for use in extrusion coating is preferably produced by
  subjecting ethylene, optionally with hydrogen and/or comonomers, to polymerization or copolymerization reactions in a multistage polymerization sequence of successive polymerization stages,
  carrying out the polymerization reactions in the presence of a single site catalyst capable of forming a composition comprising
  a low molecular weight component with an $MFR_2$ of 20 g/10 min or more and a density higher than the density of the composition, and
  a high molecular weight component, said composition having a melt flow rate $MFR_2$ of 5 g/10 min or more and a density of 915–960 kg/m$^3$.

According to a preferred embodiment of the invention, the polymerization comprises the steps of
  subjecting ethylene and optionally hydrogen and/or comonomers to a first polymerization or copolymerization reaction in the presence of a single-site catalyst in a first reaction zone or reactor to produce a first polymerization product with an $MFR_2$ of 20 g/10 min or more;
  recovering the first polymerization product from the first reaction zone;
  feeding the first polymerization product to a second reaction zone or reactor;
  feeding additional ethylene and, optionally, comonomers to the second reaction zone;
  subjecting the additional ethylene and optionally additional monomer(s) and/or hydrogen to a second polymerization reaction in the presence of the single-site catalyst and the first polymerization product to produce a second polymerization product having a $MFR_2$ of 5 g/10 min or more; and
  recovering the combined polymerization product from the second reaction zone.

In the first step of the process, ethylene with the optional comonomer(s) is fed into the first polymerization reactor. Along with these components is optionally fed also hydrogen, which functions as a molecular weight regulator. The amount of hydrogen depends on the desired molecular weight of the polymer. The catalyst may be fed to the reactor together with the reagents or, preferably, prior to the reagents, normally by flushing with a diluent.

The polymerization medium typically comprises the monomer (i.e. ethylene) and/or a hydrocarbon, in particular, a light inert hydrocarbon, such as propane, iso-butane, n-butane or isopentane. The fluid is either liquid or gaseous. In the case of a slurry reactor, in particular a loop reactor, the fluid is liquid and the suspension of polymer is circulated continuously through the slurry reactor, whereby more suspension of polymer in particle form in a hydrocarbon medium or monomer will be produced.

The conditions of the slurry reactor are selected so that 30–70 wt-%, preferably 40–60 wt-%, of the whole production is polymerized in the slurry reactor(s). The temperature is in the range of 40 to 110° C., preferably in the range of 70 to 100° C. The reaction pressure is in the range of 25 to 100 bar, preferably 35 to 80 bar, and the mole fraction of ethylene in the liquid phase is typically 4–10% by mole. In order to produce a polyethylene having a density in excess of 960 kg/m$^3$, the polymerization is preferably carried out at supercritical conditions at temperatures over 90° C. In slurry polymerization more than one reactor can be used in series. In such a case the polymer suspension in a reaction medium produced in the slurry reactor is fed without separation of inert components and monomers intermittently or continuously to the following slurry reactor, which acts at lower pressure than the previous slurry reactor.

The polymerization heat is removed by cooling the reactor with a cooling jacket. The residence time in the slurry reactor must be at least 10 minutes, preferably 20–100 min for obtaining a sufficient degree of polymerization.

As discussed above, if a low molecular weight polyethylene is the desired product, hydrogen is fed into the reactor. With a catalyst according to the present invention, a very small amount of hydrogen is sufficient to produce a high $MFR_2$ polyethylene. Thus, an $MFR_2$ of 50–300 g/110 min can be obtained with a hydrogen-to-ethylene feed ratio between 0.1–0.5 kg of hydrogen/ton of ethylene. The hydrogen is typically consumed in the reactor, so that the molar ratio of hydrogen to ethylene in the reaction mixture is between 0.4 and 1 kmol, or 400–1000 ppm by volume.

After the first reaction zone, the volatile components of the reaction medium are typically evaporated. As a result of the evaporation, hydrogen is removed from the product stream. The stream can be subjected to a second polymerization in the presence of additional ethylene to produce a high molecular weight polymer.

The second reactor is preferably a gas phase reactor, wherein ethylene and preferably comonomers are polymerized in a gaseous reaction medium in the presence of a single-site catalyst. If it is desirable to obtain a high molecular weight polymer, the polymerization is carried out essentially in the absence of hydrogen. The expression "essentially in the absence of hydrogen" means, for the purposes of this invention, that no additional hydrogen is fed to the reactor and the molar ratio of hydrogen to ethylene in the reactor is lower than 0.6 mol/kmol (600 ppm by volume), preferably les than 0.4 mol/kmol (400 ppm by volume). The gas phase reactor can be an ordinary fluidized bed reactor, although other types of gas phase reactors can be used. In a fluidized bed reactor, the bed consists of the formed and growing polymer particles as well as still active catalyst come along with the polymer fraction. The bed is kept in a fluidized state by introducing gaseous components, for instance monomer and optionally comonomer(s) on such a flow rate that will make the particles act as a fluid. The fluidizing gas can contain also inert carrier gases, like nitrogen and propane and also hydrogen as a molecular weight modifier. The fluidized gas phase reactor can be equipped with a mechanical mixer.

The gas phase reactor used can be operated in the temperature range of 50 to 115° C., preferably between 60 and 110° C. and the reaction pressure between 10 and 40 bar and the partial pressure of ethylene between 1 and 20 bar, preferably 5–10 bar.

The production split between the high molecular weight polymerization reactor and the low molecular weight polymerization reactor is 30–70:70–30. Preferably, 30 to 70 wt-%, in particular 40 to 60%, of the ethylene homopolymer or copolymer is produced at conditions providing a polymer constituting the low molecular weight portion of the polymer, and 70 to 30 wt-%, in particular 60 to 40 wt-%, of the ethylene homopolymer or preferably copolymer is produced at conditions providing the high molecular weight portion of the polymer. The density of the low molecular weight portion is preferably into the polyethylene composition prior to the extrusion. 930–975 kg/m$^3$ and the density of the final polymer is preferably 915 to 960 kg/m$^3$.

The present ethylene polymers and copolymers of ethylene can be blended and optionally compounded with additives and adjuvants conventionally used in the art. Thus, suitable additives include antistatic agents, flame retardants, light and heat stabilizers, pigments, processing aids and carbon black. Fillers such as chalk, talc and mica can also be used.

The Extrusion Coating Composition

According to the present invention, the coating of a substrate is carried out by extruding the bimodal polyethylene composition obtained by the polymerization process described above on the substrate.

The polyethylene composition comprises, according to the invention, 30 to 70 wt-%, preferably 40 to 60 wt-%, and in particular 45 to 55 wt-% of a high molecular weight portion, and 70 to 30 wt-%, preferably 60 to 40 wt-%, and in particular 55 to 45 wt-% of a low molecular weight portion. The melt flow rate MFR$_2$ of the composition is typically 5 g/10 min or more, preferably in the range of 5–50 g/10 min, and in particular in the range of 10–20 g/10 min.

The density of the polymer product is from about 915 kg/m$^3$ to about 960 kg/m$^3$.

The density of the polymer and the density and the melt flow rate of the low molecular weight component correlate preferably as presented in the following:

If the density of the composition is between 940–960 kg/m$^3$, the MFR$_2$ of the low molecular weight component is preferably between 70–1000 g/10 min and the density is higher than 965 kg/m$^3$.

If the density of the composition is in the medium density area, i.e., between 930–940 kg/m$^3$, the low molecular weight component preferably has an MFR$_2$ between 50–1000 g/10 min and a density between 940–975 kg/m$^3$.

If the density of the composition is low, between 915–930 kg/m$^3$, the low molecular weight component preferably has an MFR$_2$ between 20–500 g/10 min and density between 935–965 kg/m$^3$.

The Extrusion

The polymer obtained from the polymerization process is fed, typically in the form of powder or pellets, optionally together with additives, to a extruding device. The extruding device is known as such and any extruding device known in the art may be used.

As already discussed, according to the present invention the film can be extruded without adding high pressure PE-LD. Thus, by means of the present invention it is possible to provide a single layer coating consisting essentially of bimodal polyethylene on a substrate. By "single layer coating" is meant that the coating is provided without coextrusion with some other polymer. Further, "consisting essentially of bimodal polyethylene" means that no high pressure PE-LD is added to the extrusion coating composition and that the composition does not contain significant amounts of other polymers, either.

According to a first embodiment of the present invention high pressure PE-LD is added to the polymerization product obtained from the polymerization process. The polymerization product and high pressure PE-LD can be blended, e.g., in a postreactor of the polymerization process (cf. above) or in the extruder.

According to a second embodiment the polymerization product obtained from the process is coextruded with high pressure PE-LD. The coextrusion is known in the art as such and any extruding device suitable for coextrusion may be used.

By adding high pressure PE-LD to the composition it is possible to enhance the processability of the extrusion composition. It is to be noted, however, that the polymer composition obtained from the polymerization process described above already has a good processability in extrusion. Therefore, if it is decided to use high pressure PE-LD, the amount can, and should, be kept low. The amount of high pressure PE-LD, calculated as the weight percentage of the high pressure PE-LD in the polyethylene coating, is typically 10 wt-% or less, preferably 0.1–8 wt-%, in particular 0.1–5 wt-% and most preferably 0.1–3 wt-%.

The coating is typically extruded on a fiber based substrate material, such as paper or paperboard (cardboard). The substrate can also be a film made of polyester, cellophane, polyamide, polypropylene or oriented polypropylene. The thickness of the film is typically 10–80 µm. Further, the substrate can be an aluminium foil, typically of a thickness from 6 µm to 300 µm.

The thickness of the coating is typically about 10–200 µm, preferably 30–100 µm. The coating weight is typically in the range of 10–100 g/m$^2$, preferably in the range of 20–50 g/m$^2$. The composition according to the invention can also be run into a film on a cast film line. A 40 µm cast film produced in this way generally exhibits the following features:

haze 10% or less, preferably 8% or less, and in particular 5% or less;

gloss 70% or more, preferably 100% or more, and in particular 120% or more;

puncture strength of 900 N/mm or more, preferably 1000 N/mm or more and, in particular, 1200 N/mm or more;

tensile strength machine/transverse direction 20/20 MPa or more, preferably 22/21 MPa or more; and tear strength machine/transverse direction 1.0/1.5 MPa or more, preferably 1.6/1.8 MPa or more, and in particular 1.6/2.0 MPa or more.

The environmental stress cracking resistance, ESCR, values of the films extruded from the present composition are typically in the range of 200–1000%, preferably in the range of 400–800% and in particular in the range of 550–700%. What is to be specifically noted is that the percentage increases as the time for exposure increases at least up to 4 weeks.

The odour and taste properties, which necessarily are determined after the coating process, are in the same level as those of known materials.

Description of Analytical Methods

All the properties under "End product properties" in Table 1 and all film properties in Table 2 are determined from the extruded film. The film is obtained by first coating a substrate and then tearing the coating from the substrate.

Odour

Odour is determined from a structure consisting of the test material coated on a polyester film. The coating weight is 40 g/m², coating speed is 100 m/min and the coating is conducted at 315° C. temperature. After the run the coating is removed from the polyester film and cut to A4 size samples. The samples are put to flasks and aged in an oven at 40° C. for 0.5 hours and 1 hour. The test is carried out by two groups of people, each group consisting of four persons. The persons smell the samples and evaluate their odour in scale 0–3 (0=odourless).

Taste

Taste is determined from a structure consisting of the test material coated on an aluminium film. The coating conditions are similar to those in the odour test. The structure is cut to three 240 mm times 320 mm pieces, which are sealed into bags. Into the bag is poured 150 ml of water and the samples are put into an oven at 40° C. for two hours. The testing is done by two groups, as in the odour test, who taste the water and rank it in scale 0–3 (0=tasteless).

Environmental Stress Cracking Resistance, ESCR

The environmental stress cracking resistance is measured as the elongation % of a 40 μm film after contact with 10% Igepal liquid at 50° C. for the indicated time period.

Neck-In

The difference between the width of the die and the final coating width.

Gloss

Gloss is measured according to ASTM D 2457v.

Haze

Haze is measured according to ASTM 1003.

Secant Modulus

Secant modulus at 1% elongation is obtained from a tensile experiment, performed according to ISO 1184. The specimen is extended along its major axis at a constant speed. A stress-strain curve is thus obtained. The value of the secant modulus is the ratio of stress to strain at 1% strain on the stress-strain curve.

Strain at Break

Strain at break is also obtained from a tensile experiment. This is the value of the strain at the point where the specimen breaks.

Hot Tack

Hot tack is measured by measuring the force which is needed to tear apart a heat sealed structure before the material has been allowed to cool. Sealing is made at different temperatures (temperature is increased by 5 or 10° C. intervals) and the sealing pressure is 1.0 N/mm². Sealing is made in 0.2 seconds. Tearing is started after 0.1 seconds from sealing and the tearing rate is 200 mm/s.

Puncture

The puncture test has been carried out according to ASTM D4649.

Tensile Strength

The experiment is performed according to ISO 1184 method. The specimen is extended along its major axis at a constant speed. Normal 50 mm could be used as a distance between grips (gauge length) in film tensile testing. 125 mm gauge length would be required for tensile modulus measurement so this was not possible for 100 mm cast film in transverse direction.

Tear Strength

Tear testing is done according to ASTM 1922. Machine direction is easier, as the thickness variation in critical test direction is better controlled. Thickness varied more in transverse direction and occasionally difficulties arise in taking the sample in a manner which guarantees an even thickness for the critical testing area.

WVTR

The water vapour transmission rate is measured in a diffusion cell where above the sample flows a stream of dry air and below the sample is an atmosphere with a constant humidity at a constant temperature (usually 37.8° C.). When the sample has reached an equilibrium, the air stream is directed to an IR detector determining the water content of the air stream. In this way can the water vapour transmission rate be measured. This method gives approximately five times higher WVTR values than ASTM E-96.

The invention is further illustrated with the aid of the following examples.

EXAMPLE 1

Catalyst Preparation 168 g of a metallocene complex (bridged siloxy-substituted bis-indenyl zirconium dichloride, according to WO 97/28170) and 9.67 kg of a 30% MAO solution supplied by Albemarle were combined and 3.18 kg dry, purified toluene was added. The thus obtained complex solution was added on 9 kg silica carrier SP9–243 by Grace having a particle size of 20 microns, pore volume of 1.5–1.7 mm³ and specific surface area of 350–400 mm²/g. The complex was fed very slowly with uniform spraying during 2 hours. Temperature was kept below 30° C.

The thus obtained catalyst was dried under nitrogen for 6 h at 75° C. temperature. After nitrogen drying, the catalyst was further dried under vacuum for 10 h.

EXAMPLE 2

Into a continuously operating 500 dm³ loop reactor, operated at 85° C. temperature and 60 bar pressure, were introduced propane diluent, ethylene, 1-butene comonomer and hydrogen together with a single site polymerization catalyst described in Example 1 so that 25 kg/h of ethylene copolymer having an MFR$_2$ of 90 g/10 min and a density of 936 kg/m³ was produced. The polymer slurry was withdrawn from the reactor, the hydrocarbons were flashed off and the polymer was introduced into the gas phase reactor operated at 75° C. temperature and 20 bar pressure. Additional ethylene and 1-butene comonomer were introduced into the reactor so that the ethylene copolymer having an MFR$_2$ of 5.6 g/10 min and a density of 924 kg/m³ was withdrawn from the reactor at a rate of 51 kg/h. The polymer was compounded in a corotating intermeshing twin screw extruder and pelletized.

The pelletized product was extruded on a substrate. The properties of the extrusion composition and the extruded film are presented in Table 1.

EXAMPLE 3 (COMPARATIVE)

A polyethylene composition of commercial high pressure PE-LD was extruded on a substrate. The properties of the composition and the extruded film are presented in Table 1.

EXAMPLE 4 (COMPARATIVE)

Into a continuously operating 500 dm³ loop reactor, operated at 85° C. temperature and 60 bar pressure, were introduced propane diluent, ethylene, 1-butene comonomer and hydrogen together with a Ziegler-Natta polymerization catalyst prepared according to Example 3 of WO 95/35323, so that 25 kg/h of ethylene copolymer having an MFR$_2$ of 100 g/10 min and a density of 941 kg/m³ was produced. The polymer slurry was withdrawn from the reactor, the hydrocarbons were flashed off and the polymer was introduced into the gas phase reactor operated at 75° C. temperature and 20 bar pressure. Additional ethylene and 1-butene comonomer were introduced into the reactor so that ethylene copolymer having an MFR$_2$ of 10 g/1 0 min and a density of 931 kg/m³ was withdrawn from the reactor at a rate of 51 kg/h. The polymer was compounded in a corotating intermeshing twin screw extruder and pelletized.

The pelletized product was extruded on a substrate. The properties of the extrusion composition and the extruded film are presented in Table 1.

TABLE 1

| | Ex.2 | Ex.3 | Ex.4 |
|---|---|---|---|
| MFR$_2$ g/10 min | 5.6 | 7.5 | 12 |
| Dens. kg/m³ | 924 | 920 | 932 |
| Film appearance | — | +++ | — |
| Melt T ° C. | 315 | 315 | 285 |
| Max rpm | 117 | >200 | 164 |
| Coat. weight variation g/m² (coex 5 + 5 g/m², 200 m/min) | 9–11 | 0 | 8–10 |
| N-I mm | 135 | 65 | 114 |
| End product properties | | | |
| Odor (1–3) BTM 14137 | 1.0 | 1.3 | 0.9 |
| Taste (1–3) BTM 14138 | 1.3 | 1.4 | 0.7 |
| ESCR, % | | | |
| 0 week | 580 | 160 | 650 |
| 2 weeks | 600 | 10 | 750 |
| 4 weeks | 670 | 4 | 470 |
| Hot tack N/° C. | 2.9/115 | 2.5/105 | 4.2/120 |
| Mechanicals, 40 μm cast | | | |
| Tens 1% secmod md/cd Mpa | 148/158 | 130/135 | 227/236 |
| Strain a break % | 740/710 | 500/620 | 920/970 |
| Tens. strength md/cd MPa | 23/21.5 | 18/17 | 21/20 |
| Tear md/cd N | 1.68/2.48 | 1.60/1.71 | 0.94/0.94 |
| Punct. N/mm | 1215 | 1105 | 853 |

TABLE 1-continued

| | Ex.2 | Ex.3 | Ex.4 |
|---|---|---|---|
| Haze % | 3.4 | 6.8 | 16.7 |
| Gloss | 126 | 83 | 105 |
| WVTR* g/m²* 24 h | 13.9 | 13.5** | 13.3 |

*Co-ex 10 gsm high pressure PE-LD of Ex. 3 + 20 gsm test material; RH 90%; T 38° C.
**LE4524 30 gsm mono The processability of the coating composition according to the present invention is on the same level as for the bimodal polyethylene produced in the presence of a Ziegler-Natta catalyst. The processability of high pressure PE-LD is, as expected, slightly better.

ESCR of both bimodal materials is superior to that of high pressure PE-LD. The composition according to the present invention has a superior time behaviour compared with the bimodal Ziegler-Natta material.

Secant modulus is a function of the density of the material, which is also verified by the values shown in Table 1. The same seems to apply for strain at break.

The material according to the present invention exhibits higher tensile and tear strengths both in machine and transverse directions than either of the two other materials. Also the puncture strength of the material produced according to the present invention is higher than those of the reference materials.

The optical properties, haze and gloss, are better than those of the other two materials.

The differences in initial sealing temperatures (hot tack) are probably due to differences in density.

EXAMPLE 5

Coextrusion Tests

The sample 'Single site catalyst' is a sample produced by polymerizing ethylene and 1-butene comonomer in two cascaded gas phase reactors in the presence of a catalyst prepared according to WO 95/12622, comprising a bis-(n-butylcyclopentadienyl)zirconium dichloride complex and MAO on a silica carrier. After the first reactor the MFR$_2$ of the polymer was 100 g/10 min and the density was 945 kg/m³. The final polymer had an MFR$_2$ of 6 g/10 min and a density of 935 kg/m³. The production split was 50/50.

The sample has been run on a Beloit line in coextrusion, with 15 g/m² PE-LD and 15 g/m² the sample of the material according to the invention. Thus, the amount of PE-LD is not in accordance with the present invention, but the aim of this example is to compare the properties of a material produced with a single site catalyst and a material produced with a Ziegler-Natta catalyst. A reference run was made using 30 g/m² PE-LD only. The physical properties of the coated paper were determined from both runs.

The sample 'Ziegler-Natta' is a sample produced using a Ziegler-Natta catalyst according to Example 3 of WO 98/30628. The sample has MFR$_2$=9 and density=931 kg/m³.

The sample has been run on a Beloit line in coextrusion, with 5 g/m² PE-LD and 15 g/m² of the Ziegler-Natta material. A reference run was made using 20 g/m² PE-LD only. The physical properties of the coated paper were determined from both runs.

Since the coating weights of the SSC and Z-N materials have been different, a direct comparison of the values of the mechanical properties would not be feasible. Instead, the figures of both materials were compared to a reference run made with the same coating weight using PE-LD. The values of tensile strength, elongation, tear strength and burst force indicate what is the value of the property of the linear coextruded coating compared to the PE-LD reference. Thus, a figure 190% indicates, that the property has been improved by 90% compared to PE-LD.

Table 2 indicates, that with respect to tensile strength and elongation, both materials give a similar improvement compared to the PE-LD. With respect to tear strength and burst force, the SSC material seems to give a bigger improvement.

The hot tack and cold tack values are similar, measured from similar samples. The results indicate that the Ziegler-Natta material gives a slightly higher force, but the single site material gives a lower temperature. The latter result is even more positive when considering the higher density of the single site catalyst material sample (935 kg/m³ vs. 931 kg/m³).

TABLE 2

|  |  | Ziegler-Natta | Single site catalyst |
|---|---|---|---|
| MFR$_2$ | g/10 min | 9 | 6 |
| Density | kg/m³ | 931 | 935 |
| Tensile strength | MD | 83% | 109% |
|  | TD | 143% | 149% |
| Elongation | MD | 190% | 204% |
|  | TD | 164% | 136% |
| Tear strength | MD | 107% | 145% |
|  | TD | 109% | 162% |
| Burst force |  | 176% | 210% |
| Hot tack | Force, N | 3.9 | 3.2 |
|  | Temp., °C. | 120 | 115 |
| Cold tack | Force, N | 8.5 | 6.2 |
|  | Temp., °C. | 125 | 115 |
| WVTR | g/m²/24 h |  | 13.5 |

The invention claimed is:

1. A process for coating a substrate, comprising
producing a bimodal polyethylene composition by
subjecting ethylene, optionally with hydrogen and/or comonomers to polymerization or copolymerization reactions in a multistage polymerization sequence of successive polymerization stages;
carrying out the polymerization reactions in the presence of a single site catalyst capable of forming a composition comprising
a low molecular weight component with an MFR$_2$ of 20 g/10 min or more and a density higher than the density of the composition, and
a high molecular weight component,
said composition having a melt flow rate MFR$_2$ of 10–20 g/10 min and a density of 915–960 kg/m³; and
extruding said composition on the substrate as such or by adding 10 wt % or less, calculated from the total weight of the coating, of high pressure PE-LD by blending into the extrusion composition or by co-extrusion
wherein the active complex of said single site catalyst has the general formula

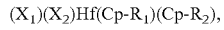

where $X_1$ and $X_2$ are thee same or different and selected from the group comprising halogen, methyl, benzyl, and hydrogen;
Hf is hafnium;
Cp is cyclopentadienyl group; and
$R_1$ and $R_2$ are same or different and stand for linear and branched hydrocarbyl groups containing 1–10 carbon atoms.

2. The process according to claim 1, wherein the bimodal polyethylene composition is produced by
subjecting ethylene, optionally with hydrogen and/or comonomers to a first polymerization or copolymerization reaction in the presence of a single-site catalyst in a first reaction zone or reactor to produce a first polymerization product with an MFR$_2$ of 20 g/10 min or more;
recovering the first polymerization product from the first reaction zone;
feeding the first polymerization product to a second reaction zone or reactor;
feeding additional ethylene and, optionally, comonomers to the second reaction zone;
subjecting the additional ethylene and optionally additional monomer(s) and/or hydrogen to a second polymerization reaction in the presence of the single-site catalyst and the first polymerization product to produce a second polymerization product having a MFR$_2$ of 10–20 g/10 min; and
recovering the combined polymerization product from the second reaction zone.

3. The process according to claim 1, wherein the substrate is paper or paperboard.

4. The process according to claim 1, wherein the active complex of the catalyst is bis-(n-butyl cyclopentadienyl) hafnium dihalide.

5. The process according to claim 1, wherein essentially no fresh catalyst is added to the reactors other than the first one.

6. The process according to claim 1, wherein the process is carried out in a polymerization reactor cascade comprising a loop reactor and a gas phase reactor, in that order.

7. The process according to claim 1, wherein the process is carried out in a polymerization reactor cascade comprising two or more gas phase reactors.

8. The process according to claim 1 or 2, wherein 0.1–5 wt-%, calculated from the total weight of the coating composition of high pressure PE-LD is blended into polyethylene composition prior to the extrusion.

9. The process according to claim 1 or 2, wherein 0.1–3 wt-%, calculated from the total weight of the coating composition of high pressure PE-LD is blended into the polyethylene composition prior to the extrusion.

10. A process for coating a substrate, comprising:
producing a bimodal polyethylene composition by
subjecting ethylene, optionally with hydrogen and/or comonomers to polymerization or copolymerization reactions in a multistage polymerization sequence of successive polymerization stages;
carrying out the polymerization reactions in the presence of a single site catalyst capable of forming a composition comprising
a low molecular weight component with an MFR$_2$ of 20 g/10 min or more and a density higher than the density of the composition, and
a high molecular weight component,
said composition having a melt flow rate MFR$_2$ of 10–20 g/10 min and a density of 915–960 kg/m³;
extruding said composition on the substrate as such or by adding 10 wt % or less calculated from the total weight of the coating, of high pressure PE-LD by blending into the extrusion composition or by co-extrusion,
wherein the active complex of the catalyst is a siloxy-substituted bis-indenyl zirconium dihalide.

11. The process according to claim 10, wherein a metallocene catalyst is used as the single site catalyst.

12. A process for coating a substrate, comprising:
producing a bimodal polyethylene composition by
subjecting ethylene, optionally with hydrogen and/or comonomers to polymerization or copolymerization reactions in a multistage polymerization sequence of successive polymerization stages;
carrying out the polymerization reactions in the presence of a single site catalyst capable of forming a composition comprising
a low molecular weight component with an MFR$_2$ of 20 g/10 min or more and a density higher than the density of the composition, and
a high molecular weight component,
said composition having a melt flow rate MFR$_2$ of 10–20 g/10 min and a density of 915–960 kg/m$^3$; and
extruding said composition on the substrate as such or by adding 10 wt % or less, calculated from the total weight of the coating, of high pressure PE-LD by blending into the extrusion composition or by co-extrusion,
wherein 0.1–8 wt %, calculated from the total weight of the coating composition, of high pressure PE-LD is blended into the polyethylene composition prior to the extrusion,
wherein 30 to 70% of the ethylene homopolymer or copolymer is produced at conditions which provide a polymer having a MFR$_2$ of 10 g/10 min or more and 70% of the ethylene homopolymer or copolymer is produced at conditions which provide a polymer having a MFR$_2$ of less than 10 g/10 min or more and 70 to 30% of the ethylene homopolymer or copolymer is produced at conditions which provide a polymer having a MFR$_2$ of less than 5 g/10 min.

13. The process according to claim 10, wherein 40 to 60% of the ethylene homopolymer or copolymer is produced at conditions which provide a polymer having a MFR$_2$ of 10 g/10 min or more and 60 to 40% of the ethylene homopolymer or copolymer is produced at conditions which provide a polymer having a MFR$_2$ of less than 5 g/10 min.

14. The process according to claim 1 or 2, wherein the composition is coextruded on the substrate together with high pressure PE-LD so as to form a coating comprising 0.1–8 wt-%, calculated from the total weight of the coating, of high pressure PE-LD.

15. The process according to claim 14, wherein said coating composition comprises 0.1–5 wt-%, calculated from the total weight of the coating of high pressure PE-LD.

16. The process according to claim 14, wherein said coating composition comprises 0.1–3 wt-%, calculated from the total weight of the coating of high pressure PE-LD.

17. A process for coating a substrate, comprising
producing a bimodal polyethylene composition by
subjecting ethylene, optionally with hydrogen and/or comonomers to polymerization or copolymerization reactions in a multistage polymerization sequence of successive polymerization stages;
carrying out the polymerization reactions in the presence of a single site catalyst capable of forming a composition comprising
a low molecular weight component with an MFR$_2$ of 20 g/10 min or more and a density higher than the density of the composition, and
a high molecular weight component, said composition having a melt flow rate MFR$_2$ of 10–20 g/10 min and a density of 915–960 kg/m$^3$;
extruding said composition on the substrate as such or by adding 10 wt % or less, calculated from the total weight of the coating, of high pressure PE-LD by blending into the extrusion composition or by co-extrusion,
wherein the active complex of the catalyst is a siloxy-substituted bis-indenyl zirconium dihalide.

18. A process for coating a substrate, comprising
producing a bimodal polyethylene composition by
subjecting ethylene, optionally with hydrogen and/or comonomers to polymerization or copolymerization reactions in a multistage polymerization sequence of successive polymerization stages;
carrying out the polymerization reactions in the presence of a single site catalyst capable of forming a composition comprising
a low molecular weight component with an MFR$_2$ of 20 g/10 min or more and a density higher than the density of the composition, and
a high molecular weight component, said composition having a melt flow rate MFR$_2$ of 10–20 g/10 min and a density of 915–960 kg/m$^3$;
extruding said composition on the substrate as such or by adding 10 wt % or less, calculated from the total weight of the coating, of high pressure PE-LD by blending into the extrusion composition or by co-extrusion,
wherein 0.1–0.8 wt %, calculated from the total weight of the coating composition, of high pressure PE-LD is blended into the polyethylene composition prior to the extrusion,
wherein 30–70% of the ethylene homopolymer or copolymer is produced at conditions which provide a polymer having a MFR$_2$ of 10 g/10 min or more and 70–30% of the ethylene homopolymer or copolymer is produced at conditions which provide a polymer having a MFR$_2$ of less than 5 g/10 min;
wherein the active complex of said single site catalyst has the general formula

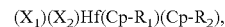

$(X_1)(X_2)Hf(Cp-R_1)(Cp-R_2)$, where $X_1$ and $X_2$ are thee same or different and selected from the group comprising halogen, methyl, benzyl, and hydrogen;
Hf is hafnium;
Cp is cyclopentadienyl group; and
$R_1$ and $R_2$ are same or different and stand for linear and branched hydrocarbyl groups containing 1–10 carbon atoms. $R_1$ and $R_2$ are same or different and stand for linear and branched hydrocarbyl groups containing 1–10 carbon atoms.

19. The process according to claim 18, wherein the substrate is paper or paperboard.

20. A process for coating a substrate, comprising
producing a bimodal polyethylene composition by
subjecting ethylene, optionally with hydrogen and/or comonomers to polymerization or copolymerization reactions in a multistage polymerization sequence of successive polymerization stages;
carrying out the polymerization reactions in the presence of a single cite catalyst capable of forming a composition comprising
a low molecular weight component with a MFR$_2$ of 20 g/10 min or more and a density higher than 965 kg/m$^3$, but higher than the density of the composition, and
a high molecular weight component, said composition having a melt flow rate MFR$_2$ of 10–20 g/10 min and a density of 940–960 kg/m$^3$; and
extruding said composition on the substrate as such or by adding 10 wt-% or less, calculated from the total weight of the coating, of high pressure PE-LD by blending into the extrusion composition or by co-extrusion wherein the active complex of said single site catalyst has the general formula $$(X_1)(X_2)Hf(Cp-R_1)(Cp-R_2),$$

where $X_1$ and $X_2$ are thee same or different and selected from the group comprising halogen, methyl, benzyl, and hydrogen;

Hf is hafnium;

Cp is cyclopentadienyl group; and $R_1$ and $R_2$ are same or different and stand for linear and branched hydrocarbyl groups containing 1–10 carbon atoms.

21. The process according to claim 20, wherein the bimodal polyethylene composition is produced by subjecting ethylene, optionally with hydrogen and/or comonomers to a first polymerization or copolymerization reaction in the presence of a single-site catalyst in a first reaction zone or reactor to produce a first polymerization product with an $MFR_2$ of 20 g/10 min or more;

recovering the first polymerization product from the first reaction zone;

feeding the first polymerization product to a second reaction zone or reactor;

feeding additional ethylene and, optionally, comonomers to the second reaction zone;

subjecting the additional ethylene and optionally additional monomer(s) and/or hydrogen to a second polymerization reaction in the presence of the single-site catalyst and the first polymerization product to produce a second polymerization product having a $MFR_2$ of 5 g/10 min or more; and recovering the combined polymerization product from the second reaction zone.

22. The process according to claim 20 or 21, wherein said composition has a density of 915–930 kg/m³, and the low molecular weight component has a $MFR_2$ of 20–500 g/10 min and a density of 935–965 kg/m³.

23. A process for coating a substrate, comprising:

producing a bimodal polyethylene composition by subjecting ethylene, optionally with hydrogen and/or comonomers to polymerization or copolymerization reactions in a multistage polymerization sequence of successive polymerization stages;

carrying out the polymerization reactions in the presence of a single cite catalyst capable of forming a composition comprising a low molecular weight component with an $MFR_2$ of 70–1000 g/10 min or more and a density higher than 965 kg/m³, and a high molecular weight component, said composition having a melt flow rate $MFR_2$ of 10–20 g/10 min and a density of 940–960 kg/m³; and extruding said composition on the substrate as such or by adding 10 wt-% or less, calculated from the total weight of the coating, of high pressure PE-LD by blending into the extrusion composition or by co-extrusion;

wherein the active complex of said single site catalyst has the general formula $$(X_1)(X_2)Hf(Cp-R_1)(Cp-R_2),$$

where $X_1$ and $X_2$ are thee same or different and selected from the group comprising halogen, methyl, benzyl, and hydrogen;

Hf is hafnium;

Cp is cyclopentadienyl group; and $R_1$ and $R_2$ are same or different and stand for linear and branched hydrocarbyl groups containing 1–10 carbon atoms.

24. A process for coating a substrate, comprising producing a bimodal polyethylene composition by subjecting ethylene, optionally with hydrogen and/or comonomers to polymerization or copolymerization reactions in a multistage polymerization sequence of successive polymerization stages;

carrying out the polymerization reactions in the presence of a single site catalyst capable of forming a composition comprising a low molecular weight component with an $MFR_2$ of 50–1000 g/10 min or more and a density in the range of 940 to 975 kg/m³ but higher than the density of the composition, and a high molecular weight component, said composition having a melt flow rate $MFR_2$ of 10–20 g/10 min and a density of 930–940 kg/m³, and extruding said composition on the substrate as such or by adding 10 wt-% or less, calculated from the total weight of the coating, of high pressure PE-LD by blending into the extrusion composition or by co-extrusion;

wherein the active complex of said single site catalyst has the general formula $$(X_1)(X_2)Hf(Cp-R_1)(Cp-R_2),$$

where $X_1$ and $X_2$ are thee same or different and selected from the group comprising halogen, methyl, benzyl, and hydrogen;

Hf is hafnium;

Cp is cyclopentadienyl group; and $R_1$ and $R_2$ are same or different and stand for linear and branched hydrocarbyl groups containing 1–10 carbon atoms.

* * * * *